US012608295B2

(12) United States Patent
El Boudi et al.

(10) Patent No.: US 12,608,295 B2
(45) Date of Patent: Apr. 21, 2026

(54) AUTOMATIC DETERMINATION OF A DIGITAL LIFESTYLE MEASUREMENT BY AGGREGATING A SET OF HETEROGENEOUS MEASUREMENTS FROM HETEROGENEOUS SOURCES

(71) Applicant: UNIVERSITÉ GRENOBLE ALPES, Saint Martin d'Hères (FR)

(72) Inventors: Islam El Boudi, Grenoble (FR); Nicolas Vuillerme, Saint Martin d'Hères (FR)

(73) Assignee: UNIVERSITÉ GRENOBLE ALPES, Saint Martin D'Hères (FR)

( * ) Notice: Subject to any disclaimer, the term of this patent is extended or adjusted under 35 U.S.C. 154(b) by 0 days.

(21) Appl. No.: 18/844,900

(22) PCT Filed: Mar. 7, 2023

(86) PCT No.: PCT/IB2023/052140
§ 371 (c)(1),
(2) Date: Sep. 6, 2024

(87) PCT Pub. No.: WO2023/170574
PCT Pub. Date: Sep. 14, 2023

(65) Prior Publication Data
US 2025/0199936 A1 Jun. 19, 2025

(30) Foreign Application Priority Data
Mar. 8, 2022 (FR) ...................................... 2201977

(51) Int. Cl.
*G06F 11/34* (2006.01)
*G06F 11/30* (2006.01)

(52) U.S. Cl.
CPC ...... *G06F 11/3438* (2013.01); *G06F 11/3062* (2013.01)

(58) Field of Classification Search
CPC .... G06F 11/3438; G06F 11/3062; A61B 5/16; G16H 40/67; G16H 50/30
USPC ........................................................... 714/1
See application file for complete search history.

(56) References Cited

U.S. PATENT DOCUMENTS

2010/0076274 A1* 3/2010 Severson .............. G06F 16/435
707/E17.127
2025/0217457 A1* 7/2025 El Boudi ............ H04L 63/0227

OTHER PUBLICATIONS

International Search Report w/English translation for PCT/IB2023/052140, mailed Jun. 28, 2023, 5 pages.
Written Opinion of the ISA w/English translation for PCT/IB2023/052140, mailed Jun. 28, 8 pages.
(Continued)

*Primary Examiner* — Yair Leibovich
(74) *Attorney, Agent, or Firm* — Nixon & Vanderhye

(57) ABSTRACT

A system for determining a degree of dependence on screens of a user, including
at least one software module embedded in a set of information processing apparatuses, adapted for collecting first measurements about the behavior of the applications installed on said information processing apparatuses and second measurements about the behavior of said information processing apparatuses;
a database for storing said measurements;
a server for periodically determining an aggregation of said measurements and a degree of dependence on screens according to said aggregation.

8 Claims, 3 Drawing Sheets

(56) References Cited

OTHER PUBLICATIONS

French Preliminary Search Report w/English translation for FR 2201977, dated Nov. 7, 2022, 10 pages.
Geyer Kristoffer et al., "Open-source smartphone app and tools for measuring, quantifying, and visualizing technology use", Behavior Research Methods, Springer US, New York, vol. 54, No. 1, Jun. 3, 2021, pp. 1-12.
Mireia Adelantado-Renau et al., "Association Between Screen Media Use and Academic Performance Among Children and Adolescents", JAMAPediatrics, Sep. 23, 2019, 10 pages.
Jeroen S. Lemmens et al., "Development and Validation of a Game Addiction Scale for Adolescents", Taylor & Francis Online, Nov. 7, 2007, 5 pages.
Şahin Gökçearslan et al., "Modelling smartphone addiction: The role of smartphone usage, self-regulation, general self-efficacy and cyberloafing in university students", Elsevier Ltd., Nov. 24, 2015, 11 pages.
Zubair Ahmed Ratan et al., "Smartphone Addiction and Associated Health Outcomes in Adult Populations: A Systematic Review", International Journal of Environmental Research and Public Health, Nov. 22, 2021, 17 pages.
Shiri Prizant-Passal et al., "Social anxiety and internet use—A meta-analysis: What do we know? What are we missing?", ScienceDirect, Sep. 2016, 7 pages.
Lutz Wartberg et al., "The relevance of emotion regulation, procrastination, and perceived stress for problematic social media use in a representative sample of children and adolescents", Elsevier Ltd., Mar. 20, 2021, 7 pages.
Min Kwon et al., "The Smartphone Addiction Scale: Development and Validation of a Short Version for Adolescents", PLoS One, Dec. 31, 2013, 17 pages.
Carolyn A Lin, "Unregulated Internet Usage: Addiction, Habit, or Deficient Self-Regulation?", Research Gate, Jan. 2003, 31 pages.

* cited by examiner

[Fig. 1]

AUTOMATIC DETERMINATION OF A DIGITAL LIFESTYLE MEASUREMENT BY AGGREGATING A SET OF HETEROGENEOUS MEASUREMENTS FROM HETEROGENEOUS SOURCES

CROSS-REFERENCE TO RELATED APPLICATIONS

This application is the U.S. national phase of International Application No. PCT/IB2023/052140 filed Mar. 7, 2023 which designated the U.S. and claims priority to FR 2201977 filed Mar. 8, 2022, the entire contents of each of which are hereby incorporated by reference.

FIELD OF THE INVENTION

The present invention relates to the determination of a degree of dependence on screens, representative of the digital lifestyle of a user. In particular, for the above purpose, the invention aims to aggregate objective and holistic measurements.

CONTEXT OF THE INVENTION

The excessive use of screens is now recognized as a major problem in our society. Furthermore, the global pandemic that began in 2020 led individuals to confine themselves for several months and intensified both the behaviors of dependence on screens and the number of scientific and political reflections around the issue.

In France, MILDECA (Mission Interministérielle de Lutte contre les Drogues et les Conduites Addictives [Inter-ministerial mission to combat drugs and addictive behaviors]) issued a report in 2021 stating that 24% of young French people being 15-24 years old report watching videos more than 4 hours a day and 33% of young people play online games the same number of hours each day.

However, an excessive use of screens (e.g. smartphones, Internet, online games) causes many consequences that can be dramatic for the health and cognitive development of adolescents and young adults. Indeed, the difficulty in regulating the use of screens can lead to serious pathological disorders such as an addiction to video games.

Recent results have shown that regular exposure to television set or video games is associated with fewer positive attitudes toward school and with lower academic performance. We can notably cite Adelantado-Renau et al., "Association Between Screen Media Use and Academic Performance Among Children and Adolescents: *A Systematic Review and Meta-analysis*", 2019, DOI: 10.1001/jamapediatrics.2019.3176.

This can be explained in particular by the fact that excessive use of screens is also linked to weaker cognitive skills such as a weak perception to self-regulate, as explained e.g. in Gökçearslan et al., "*Modeling smartphone addiction: The role of smartphone usage, self-regulation, general self-efficacy and cyberloafing in university students*" in Computers in Human Behavior, 2016, DOI: 10.1016/j.chb.2016.05.091, or LaRose et al., «*Unregulated Internet Usage: Addiction, Habit, or Deficient Self-Regulation?*' in Media Psychology, 5(3), 225-25, 2003.

Wartberg et al., "*The relevance of emotion regulation, procrastination, and perceived stress for problematic social media use in a representative sample of children and adolescents*" in Computers in Human Behavior, vol. 121, 2021, also links this excessive use to more inattention.

Furthermore, an excessive use of screens is associated with poorer sleep quality, e.g. according to Chen & Gau., "*Sleep problems and internet addiction among children and adolescents: a longitudinal study*", in Journal of Sleep Research, 2016, or Ratan et al., "*Smartphone Addiction and Associated Health Outcomes in Adult Populations: A Systematic Review*", in International Journal of Environmental Research and Public Health, 2021, and also with lower self-esteem, with greater anxiety and with more depression, as discussed in Prizant-Passal et al., "*Social anxiety and internet use—A meta-analysis: What do we know? What are we missing*?", in Computers in Human Behaviors, vol. 62, 2016, or in the aforementioned article of Ratan et al.

To prevent or even remedy such difficulty, one of the challenges is to identify individuals who are likely to use the screens excessively.

However, reporting problematic screen usage practices is usually done using self-reported questionnaire measurements. One example is the smartphone addiction scale of Kwon et al., "*The smartphone addiction scale: development and validation of a short version for adolescents*", 2013, https://doi.org/10.1371/journal.pone.0083558, and the game addiction scale described in Lemmens et al, "*Development and Validation of a Game Addiction Scale for Adolescents*" in Media Psychology 12(1): 77-95, 2009, DOI: DOI: 10.1080/15213260802669458.

US2010/076274A1 describes a human/digital media interaction tracking system according to the prior art.

SUMMARY OF THE INVENTION

An aim of the present invention is to provide an objective approach for determining a degree of dependence on screens of a user. Such degree makes it possible to evaluate the digital lifestyle.

The degree of digital lifestyle is a characterization of the impact of screens on a user's health. Such characterization is a continuum that extends from moderate use to problematic use. The problematic use of screens can be observed in several cases:

when the recreational use of screens has become the only activity of a user during his/her wakening time, when the user sacrifices aspects of his/her social life in favor of the recreational use of screens (schooling, professional situation, situations relating to family or friends), when the user's health is endangered due to the use of screens (sedentary lifestyle, sleep, social isolation, depression).

Digital lifestyle comprises the use of apparatuses and in particular the use of apparatuses with screens. Excessive use of these screens is a bad digital lifestyle.

The invention thus aims to determine a quantification, or a quantitative (and qualitative) measurement, of this digital lifestyle. More particularly, the invention aims to determine a degree of dependence on screens, and thereby makes it possible to assign the user to a class among e.g. normal behavior, abnormal but not problematic behavior, and problematic behavior that may be related to dependence, or addiction.

More particularly, the invention aims to allow an evaluation of this digital lifestyle that is not solely dependent on the statement of the users of the screens which can be distorted and lead to a bad diagnosis.

The invention further aims to prevent being too intrusive but, on the contrary, aims to be as transparent as possible in order not to affect the quality of life of users by imposing additional actions, and in order to prevent them from modifying their behaviors because of the monitoring.

The invention further aims to allow a tracking over time of the digital lifestyle of the users and of their possible addictions. Indeed, methods based on questionnaires to be filled in only serve to obtain a "snapshot" of a user's condition, and it would be necessary to multiply the entries to be able to detect changes in the addiction (or more generally in digital lifestyle), which may not be acceptable to users and/or hinder the provision of accurate and correct answers.

Finally, the invention aims to offer a holistic evaluation, i.e. to cover the use of the different screens and apparatuses available to a same user.

To this end, according to a first aspect, the present invention can be implemented by a system for determining a degree of dependence on screens of a user, including at least one software module embedded in a set of information processing apparatuses, adapted for collecting first measurements about a behavior of applications installed on said set of information processing apparatuses, and second measurements about a behavior of said set of information processing apparatuses;

a database for storing said measurements;

a server for periodically determining an aggregation of said measurements and a degree of dependence on screens according to said aggregation, the system further includes at least one probe embedded in an electrical plug supplying power to at least one apparatus among a television set and a video game console, and apt to collect third measurements about an electrical behavior of said at least one apparatus; said server being adapted for determining said aggregation according to said third measurements.

According to preferred embodiments, the invention comprises one or more of the following features which can be used separately or in partial combination with each other or in full combination with each other:

said electrical plug is adapted for collecting a particular measurement in the event of a physical disconnection of said at least one apparatus;

said electrical plug is arranged so that, upon said physical disconnection, said electrical plug is no longer supplied with power;

said server is adapted for assigning a class to said user based on said degree of dependence on screens;

said server is adapted for determining an aggregation of measurements of the same nature from separate apparatuses.

According to a second aspect, the invention can also be implemented by a method for determining a degree of dependence on screens of a user, including collecting first measurements about a behavior of applications installed on a set of information processing apparatuses, and second measurements about a behavior of said set of information processing apparatuses, by at least one software module embedded in said set of information processing apparatuses;

storing said measurements in a database;

periodically determining an aggregation of said measurements and a degree of dependence on screens according to said aggregation, by a server;

the method further includes collecting third measurements about an electrical behavior of at least one apparatus, by a probe embedded in an electrical plug supplying power to the at least one apparatus among a television set and a video game console, said aggregation taking into account said third measurements.

According to preferred embodiments, the invention comprises one or more of the following features which can be used separately or in partial combination with each other or in full combination with each other:

the method includes assigning a class to said user, according to said degree of dependence on screens;

the method is implemented for a predetermined period of time.

Other features and advantages of the invention will appear upon reading the following description of one preferred embodiment of the invention, given only as an example, and in reference to the appended drawings.

DETAILED DESCRIPTION OF EMBODIMENTS OF THE INVENTION

The invention aims to capture the behavior of the user through all these digital apparatuses, in order to have a holistic view of his/her use of the apparatuses equipped with screens and of his/her possible addiction to screens, and to be able to quantify it.

More particularly, the invention comprises collecting measurements of the behavior of the used software applications, of the apparatuses such as a computer, a smartphone, a digital tablet, virtual reality headsets, connected watches, etc., but also of the apparatuses such as a television set, a video game console, etc.

One of the difficulties is to take into account apparatuses of heterogeneous natures, each requiring a specific implementation of technical means for collecting measurements. Another difficulty is to take into account heterogeneous typologies of measurements, and to aggregate same, or combine same, so as to determine a degree of dependence (or degree of digital lifestyle).

According to the inventors, this feature consisting in taking into account all the apparatuses (whatever the technical nature thereof) and all the types of measurement make it possible to monitor at best the behaviors of use of the different screens available to an individual, and, as a result, to better understand problematic uses and situations of dependence. Such approach makes it possible to determine the problematic use of screens from a plurality of objective and automatically reported indicators.

Figure 1:
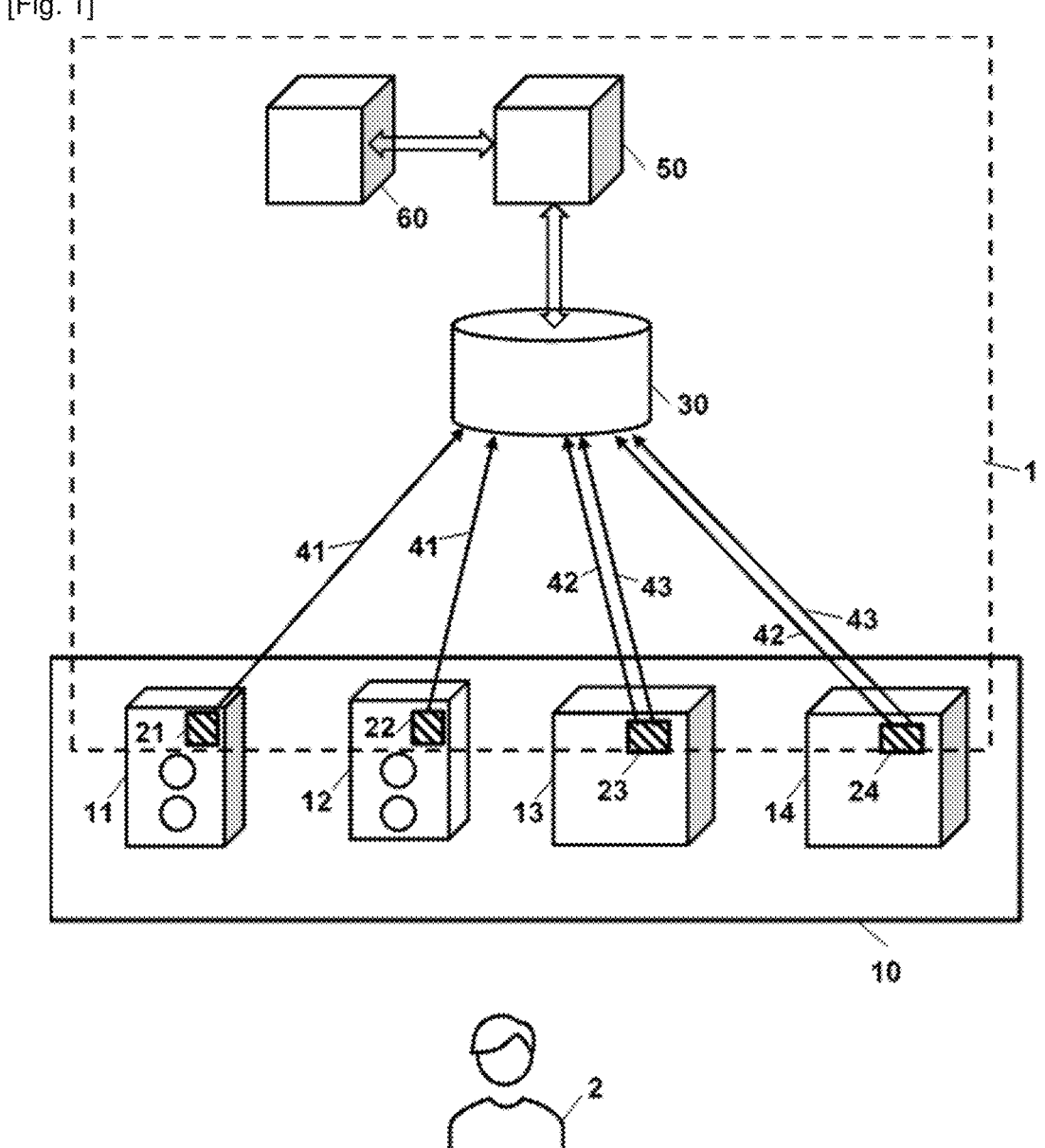
FIG. 1 schematically represents an example of architecture according to one embodiment of the invention.

FIG. 1 illustrates an architecture according to an embodiment of the invention.

A user 2 has a fleet 10 of apparatuses which have screens and which can, thus, as such, contribute to the potential dependence, or addiction, of the user 2.

Generally speaking, these apparatuses can be divided into two categories:

information processing apparatuses 13, 14, which enable a software module 23, 24, respectively, to be embedded in order to collect information, or measurements, about the behavior thereof and the behavior of the installed software applications;

other apparatuses (not shown) which do not allow such software modules to be embedded.

Among the first type of apparatus, mention may be made in particular of mobile telecommunication terminals (such as a smartphone), or other terminals equipped with a screen having an interface allowing for the installation of an ad-hoc software module such as e.g. digital tablets, computers, connected watches, virtual reality headsets, etc.

Among the second type of apparatus, mention may be made in particular of television sets, game consoles, etc. Such apparatuses generally do not have interfaces serving for the installation of an ad-hoc software module.

For this second type of apparatus, an embodiment of the invention provides a probe 21, 22 to be embedded within the electrical plugs 11, 12 supplying these apparatuses. These probes are suitable for collecting measurements about the electrical behavior of the apparatuses power-supplied by the electrical plugs.

Such a plug can have a software infrastructure and interfaces enabling software modules to be installed, implementing the functions of these probes 21, 22. Also, some plugs can natively have such software modules.

Indeed, the development of connected objects, making it possible to support the Internet of things (IoT), has led to the availability of many plug solutions making possible advanced functions and/or providing ways to embed additional functions via additional software modules.

An example of such plugs is e.g. same developed by the company SHELLY. The Shelly Plugs natively provide consumed power measurement functions and interfaces, or APIs (Application Programming Interface) allowing to access to the made measurements and to export same to devices external to the plug.

The interface of the plugs of the company Shelly is described e.g. at the link: https://shelly-api-docs.shelly.cloud/gen1/

Such plugs allow to interrogate means of measuring electrical energy via the MQTT (Message Queuing Telemetry Transport) protocol:

TOPIC MQTT shellies/<model>-<deviceid>/relay/0/power

According to one embodiment, a plug, a set of plugs, a multiple plug, or a PDU (Power Distribution Unit), can be used. In such an embodiment, the probe 21, 22 serves to collect individualized measurements for each of the plugs of the multiple plug. In this way, the electrical behavior of each power-supplied apparatus can be collected.

According to one embodiment of the invention, the electrical plug is apt to collect a particular measurement in the event of physical disconnection of a power-supplied apparatus.

More particularly, the electrical plug 11, 12 may be suitable for not permitting the disconnection of an apparatus without the detection of the disconnection by the respective probe 21, 22. According to embodiments, the probe can detect the disconnection state by different types of sensors, such as e.g.: electric current sensor, temperature sensor, accelerometric and spatial sensor, distance sensor, microswitch, pressure sensor, proximity sensor, voltage sensor, infrared sensor, shock sensor or motion sensor, etc.

To this end, one embodiment consists in arranging the electrical plug so that, when the (male) plug of the apparatus is physically disconnected from the (female) plug, the electrical plug is no longer supplied with power. For example, the plug housing 11, 12 is encapsulated in a top housing that confines the (male) plug connected by cord to the power-supplied apparatus, so that the plug cannot be disconnected without at least partially removing the top housing. The latter can be arranged so that the removal thereof, even partial, also requires disconnecting the power supply from the plug housing 11, 12. Consequently, the absence, even momentary, of power supply can be detected simply by interrogating the probes 21, 22.

The challenge is that the measurement of the behavior of the plug 11, 12 effectively corresponds to the electrical behavior of the power-supplied apparatus. For this purpose, it is necessary to guarantee an unequivocal link between a given plug and an associated apparatus, and hence to prevent a user from connecting one particular apparatus to another (possibly unmonitored) plug or from connecting another apparatus to the given monitored plug.

For example, this embodiment makes it possible to prevent a user from disconnecting his/her game console from the monitored plug 11, 12 in order to connect same to another plug in his/her home. The result would obviously be that the collected measurements would be distorted and would lose in relevance.

In general, the measurements collected by the probes 21, 22 are thus intended to be representative of the electrical behavior of a monitored apparatus that is likely to be involved in a dependence on screens of the user.

This electrical behavior can be based on the "on" or "off" feature of the apparatus. From the monitoring of such feature, the probes 21, 22 can determine measurements 41 relating to the electrical behavior of the apparatus in terms of:

duration of use of the power-supplied apparatus, times of use of the power-supplied apparatus (switching on and switching off times), internal temperature of the plug, electrical consumption of the power-supplied apparatus.

Figures 2, 3:
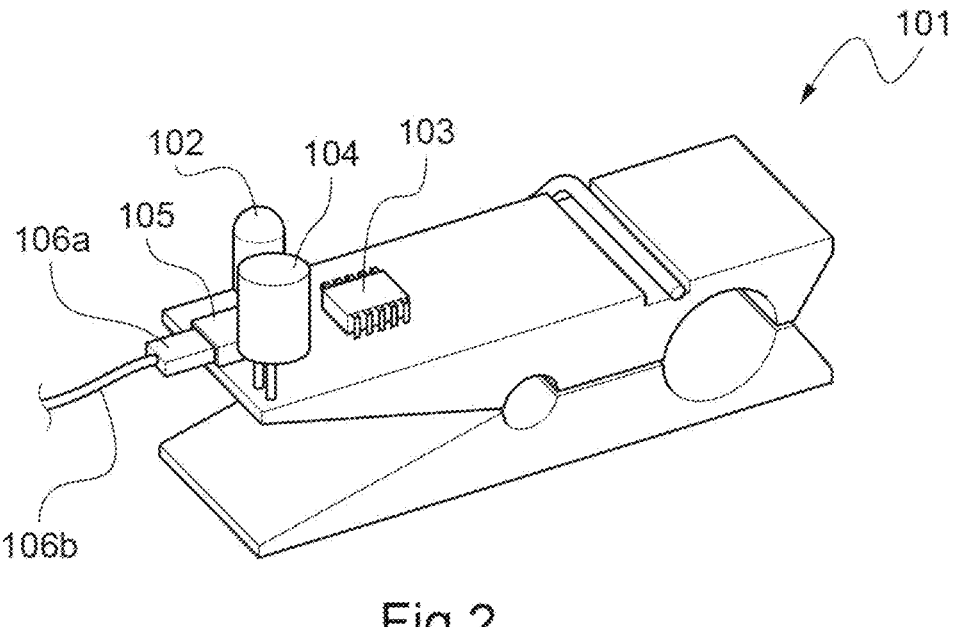
FIG. 2 is a schematic view of a device for checking the state of connection.
FIG. 3 is a schematic view of a game console and of a device for checking the state of use of a game console in a first position.

In a variant of the detection of the electrical consumption of the power-supplied apparatus, FIG. 2 schematically illustrates another device 101 in the form of a clamp, serving to assure the state of connection between the male plug and the female plug of an apparatus. The device 101 is clamped on the cable (not shown) of the power cord of the apparatus. Indeed, to disconnect the male plug from the female plug, the user has to exert a force on the male plug. The device 101 is apt to measure that a disconnection force has been applied along the cord of the male plug. This force needed for the disconnection of the apparatus causes a direct warning (luminous) signal on a light emitting diode (LED) 102 and/or a sending of data to servers (not shown). The device 101 comprises, in this illustrative and non-limiting embodiment, a microprocessor 103, a movement sensor 104 and a connector 105 for receiving a plug 105a connected to a cable 105b, used to transfer data from the device 101 to servers and to supply power to the device 101. Any other means of data transmission can however be envisaged in the context of the invention (Bluetooth signal, WiFi, LoRa, Sigfox, sound signal, sending SMS, vibrations, etc.). The device 101 can e.g. be implemented with an Arduino Nano® system. When the device 101 is clamped on a power cable of an apparatus to be monitored, any disconnection of the apparatus creates a sudden movement on the power cable thereof, detected by the device 101.

The motion sensor can be any sensor apt to detect a movement at the cord where the clamp is attached (tilt ball sensor, accelerometer, gyroscope, pressure, piezoelectric, light divergence, vibration).

It is of course understood that the mode of attachment of the device 101 at the cable is not necessarily a clamp. The device 101 can be attached by any other means allowing the movements of the cable to be followed in a secured manner.

In the case where the motion sensor is an accelerometer, the algorithm for detecting an attempt to disconnect an apparatus to be monitored is as follows:

initial state of the position sensor (X1, Y1, Z1)

motion/shock detection delay (e.g. 45 seconds)

reading of the position sensor (Xi, Yi, Zi)

if at least one of the coordinates (Xi, Yi, Zi) differs by more than 10% from the coordinates (X1, Y1, Z1), detecting an attempt to disconnect, otherwise false alarm (simple movement of the apparatus to be monitored).

Figure 4:
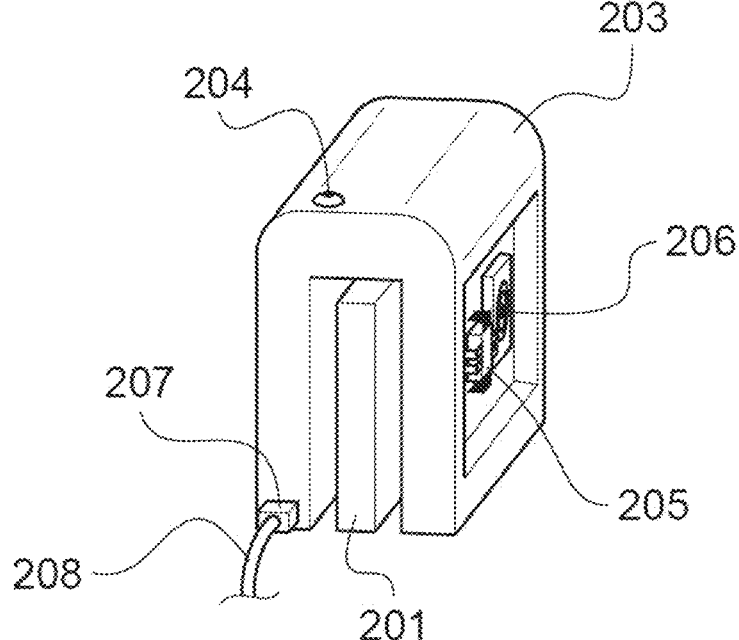
FIG. 4 is a schematic view of the game console and of the device of FIG. 3 in a second position.

FIGS. 3 and 4 schematically illustrate another device 203 serving to assure the state of use of a game console or a tablet computer 201.

The apparatus considered herein is a flat apparatus, such as a game console or tablet computer 201, which is equipped with an RFID chip 202 stuck to the rear side of the game console or tablet computer 201.

The device 203 is in the form of a pedestal having the shape of a narrow elongated arch, defining a space for receiving the game console or tablet computer 201.

The device 203 comprises a LED 204, a processor 205, an RFID sensor 206, and is supplied with power by a plug 207 connected to a cord 208, the plug 207 and the cord 208 making possible both to supply power to the device 203 and to transfer data from/to the device 203.

In the position shown in FIG. 3, the game console or tablet computer 201 is outside the receiving space of the device 203, so the RFID chip 202 of the game console or tablet computer 201 is not detected by the RFID sensor 206: it is then assumed that the game console or tablet computer 201 is in use.

In the position shown in FIG. 4, the game console or tablet computer 201 is in the receiving space of the device 203, so the chip RFID 202 of the game console or tablet computer 201 is detected by the sensor RFID 206: the game console or tablet computer 201 is then not in use.

When the processor 205 detects the presence of the chip 202 attached to the game console or tablet computer 201, the processor 205 sends to a server (not shown) according to a determined period, e.g. every minute, an incremental amount of non-use of the game console in a time-stamped manner (e.g. using a set of three parameters: {"TimeNotinUse": 256, "FirstDetectionTime": "8:45 am", "FirstDetectionTime": "8:30 pm"}), except in the case where the user has unlocked time on the game console or tablet computer 201.

In addition, when restrictions on the use of the game console or tablet computer 201 are to be applied, the luminous signal of the LED differs in the case where the user can use the game console or tablet computer and in the case where the user cannot use same, e.g. the LED turns on when the user can use the portable game console and the LED 204 turns off when the user cannot use the game console or tablet computer 201.

If the user decides to use the game console or tablet computer 201 when the user does not have the right to use screens, the device 203 sends data to a server in order to implement an alert.

It is possible to use other transmitters apt to transmit usage information when the user is not authorized to use the portable game console or tablet computer (e.g.: Bluetooth signal, sound signal, WiFi signal, LoRa, Sigfox, sending SMS, vibration).

The devices 101 and 203 thus allow to know the state of use of the apparatuses supplied with power by a power cord and of game consoles or tablet computers.

The measurements 41 allow to obtain an overview of the use of such apparatuses, such as a television set, video game consoles, not only as regards the total duration of use, but also as regards the times of use. Indeed, as part of the evaluation of a potential addiction, using a game console, e.g. in the morning or evening, is not indifferent, the first case being a priori more revealing of a dependence.

The measurements 41 thereby collected can be transmitted to a remote database 30 to be stored therein.

Furthermore, the apparatuses 13, 14 are information processing apparatuses. Such apparatuses thus serve to install software modules 23, 24 in an easier manner and provide richer interfaces for the monitoring of the behavior of both the applications installed and executed on these apparatuses and the apparatuses themselves.

As mentioned hereinabove, these apparatuses can be computers (such as a desktop or a laptop), smart communication terminals (or smartphones), digital tablets, or any other existing or future apparatus, with an operating system allowing the implementation of software modules and providing interfaces for obtaining measurements on the applications and the apparatus.

According to the invention, the software modules 23, 24 are suitable for collecting two types of measurements (at least):

measurements 42 about the behavior of the applications installed on the information processing apparatuses, and measurements 43 about the behavior of the information processing apparatuses themselves.

Generally speaking, the software modules are installed to be launched when the user opens a session on said apparatus and to operate continuously in background, in order to collect real-time measurements about the user's activities. When the apparatus does not support multiple sessions, the opening of a session for the user is equivalent to turning on the apparatus.

For example, on a computer running on the Windows® operating system, the software module is placed in the directory: Users/<user_name>/AppData/roaming/Microsoft/Windows/StartMenu/Programs/Startup wherein <user_name> is the user's name as registered in the Windows® operating system (thus corresponding to the user's session).

Thereby, at each opening of its Windows® session, the software module will be automatically executed.

Furthermore, the software module can be a program in Python® language, and be stored in the apparatus in the form of a ".pyw" file. As a result, the software module can be considered as a service, so as not to be detected as a software and so as to make more difficult its detection and its closing by the user.

In the same way, on an apparatus running with a Mac OS® operating system of the company Apple®, the software module can be stored in the directory: ~/Library/Launch Daemons/

In this way, the software module is automatically executed when the apparatus is started.

Likewise as well, the software module can be a program in Python® language, and be stored in the apparatus in the form of a ".pyw" file. As a result, the software module can be considered as a service, so as not to be detected as a software and so as to make more difficult its detection and its closing by the user.

On an apparatus such as a tablet computer or a telecommunication terminal, the software module can be a launcher in order to be automatically executed when the apparatus is started.

This software module (or application) can be declared via the Android® intent mechanism to respond to the "home" and "default" actions:

```
<category android :name = ''android.intent.category.DEFAULT''/>
<category android :name = "android.intent.category.HOME" />
```

The background services mechanism is used for a continuous analysis of the apparatus.

The foreground service mechanism is used to indefinitely maintain the service in background.

The system service "Usage_stat_service" is used to analyze the open applications and to bring the software module back to the foreground if needed.

On an apparatus running with an iOS operating system of the company Apple® or with an Android® operating system, the MDM (Mobile Device Management) tool can be used to put the apparatus into a supervised mode and to allow a continuous analysis of the phone.

According to embodiments of the invention, the measurements 42 about the behavior of the applications installed on the information processing apparatuses comprise all or part of the following measurements:

name of the application, duration of use of each application (start time, end time), times of use of each application, frequency of opening of each application.

According to embodiments of the invention, the measurements 43 about the behavior of the information processing apparatuses comprise all or part of the following measurements:

Login and logout times of a session;

On and off times of the apparatus;

Movement of the apparatus (number of steps, etc.);

Orientation of the apparatus;

Brightness of the apparatus;

Frequency of interactions with the apparatus (number of clicks or other interactions).

Such measurements can, of course, take several forms. For example, a software module can transmit events that indicate the launching and closing times of an application. It is then easy to automatically determine the duration of use, either by the database 30 (or more precisely the managing application of this database), or by the server 50. The software module can also perform alone such calculation and transmit same to the database for storage.

In general, the person skilled in the art would understand that these measurements can have equivalent variants, i.e. from which the same semantic information can be automatically and directly deduced. More particularly, these equivalent variants should enable the server to determine the above-mentioned aggregated measurements.

According to one embodiment, these measurements can be supplemented by declarative data self-reported by the user (e.g. sleep schedule, emotion log, etc.).

According to one embodiment, all the measurements are carried out by the software modules and transmitted to the database 30 for storage.

This set of heterogeneous measurements 41, 42, 43 (or equivalent variants) provides a complete and holistic view that leads to determining a state of the user in relation to a possible dependence on screens. According to such embodiment, this set provides a snapshot that optimizes the determination of a relevant state of the user.

The measurements 41, 42, 43 collected by the software modules can be stored in real-time or near real-time in the database 30.

The stored measurements can then be consumed periodically by a server 50 in an asynchronous manner, in order to determine aggregated measurements. These aggregated measurements take into account all the measurements 41, 42, 43 concerning a user and, hence all the screens that the user may be required to use over time.

According to one embodiment, the server 50 interrogates the database 50 once a day in order to determine aggregated measurements. The aggregated measurements are then representative of a daily behavior of the user with respect to the screens available to the user.

The aggregate measurements are based on heterogeneous measurements from different and varied sources. For example, the usage times of all the apparatuses can be aggregated to obtain a total time spent by a person in front of a screen. Similarly, the usage times of a same application (e.g. a social network such as Facebook®) can be aggregated across all apparatuses.

According to one embodiment, aggregated measurements are determined based on measurements of the same type from different apparatuses.

These aggregated measurements can consist of the following calculations (or equivalents):

time spent in front of each application: sum of the durations of use of each application during the period in question;

overall time spent in front of each computer screen: sum of the durations of use of an apparatus (these durations being the differences between the connection and disconnection times to/from an apparatus);

overall time spent in front of each telecommunication terminal screen (smartphone or digital tablet, etc.): sum of the durations of use of an apparatus (these durations being the sums of the durations of use of an apparatus (these durations being the sums of the durations of use of the applications appearing in the foreground));

digital bedtime: maximum hour (i.e. the latest) of disconnection from all apparatuses 11, 12, 13, 14;

digital wake up: minimum hour of connection to all apparatuses 11, 12, 13, 14;

calculation of the waking time spent outside the screens: difference between the sum of the overall times spent in front of each screen and the duration of a waking day (calculated by the difference between 24 hours and the average sleep time of the user);

opening delay of each application: difference between the time of launch of the application and the time of connection to the corresponding apparatus;

regularity in digital sleep hours: the difference between the digital bedtime hours over two consecutive days;

difference between the digital bedtime and the average bedtime self-reported in the sleep schedule;

Finally, each application is associated with a category of use among, e.g., "social", "games", "video", "work" and "others".

The aggregated measurements, and thus the degree of dependence on screens, can also take into account other data, including data not derived from objective measurements made by software modules.

For example, according to one embodiment of the invention, data such as answers to questionnaires or other subjective information provided by the user can be used to supplement the objective measurements and be aggregated to same for the calculation of the degree D. Such information may e.g. correspond to weekly questionnaires about mood or physical activity.

Thereby, all kinds of data can be used. One of the main ideas of the invention lies precisely in the aggregation of heterogeneous data from different and varied sources in order to build a holistic view of the behavior of the user facing the different screens of the user.

From the aggregated measurements (and thus, indirectly, from the measurements 41, 42, 43 collected by the software modules), the server can determine a degree of dependence on screens. Such determination may be periodic, in particular according to the same period as the interrogation of the database 30.

According to one embodiment, this degree of dependence on screens can be seen as a quantification of the user's use of screens.

According to one embodiment, this degree of dependence D can be a linear combination of the aggregated measurements mi previously determined. The equation giving D can be written as follows:

$$D = \sum_{i=0}^{n} a_i . m_i \qquad \text{[Math. 1]}$$

wherein $a_i$ is a weight associated with the influence of the aggregate measurement mi in determining the degree D, and n is the number of aggregated measurements.

According to one embodiment, the equation can be written as follows:

$$D = \frac{1}{1 + e^{-\sum_{i=0}^{n} a_i . m_i}} \qquad \text{[Math. 2]}$$

The value of degree D is thereby comprised between 0 (no dependence) and 1 (strong dependence).

The parameters $a_i$ can be determined in different ways.

For example, said parameters can be obtained by linear regression, by Bayesian networks, by k-nearest neighbor algorithm, by decision trees, by artificial neural networks, by logistic regression, etc.

As an example, the degree D can be calculated by:

$D = 1/[1 + \exp(-(-7.757 + 0.433 * \text{video game time} + 0.146 * \text{social}$ $\text{network time} + 0.045 * \text{streaming time (video stream viewing)} + 0.156 *$ $\text{digital bedtime} - 0.186 * \text{digital wake up} - 0.005 * \text{video game}$ $\text{frequency} + 0.457 * \text{social network frequency} - 0.058 * \text{streaming}$ $\text{frequency} + 0.203 * \text{computer time} + 0.139 * \text{smartphone time} + 0.051 *$ $\text{tablet computer time} + 0.229 * \text{game console time}))]$ This degree D of digital lifestyle can then be used in different ways:

it can be transmitted to a user's apparatus, to allow the apparatus to display the degree and thereby indicate a monitoring, period after period, it can be transmitted to a third party (e.g. an addictologist physician or a psychologist) who can thus follow the evolution of the state of the user;

it can be used to control the user's access to the apparatuses thereof.

More particularly, in the latter case, depending on the degree of dependence on screens, certain applications can be blocked, e.g. beyond a certain time spent over a period, or on certain time slots.

For example, applications such as "games" or "video" can be blocked during working hours, or beyond 2 hours per day, e.g. if the degree of dependence on screens exceeds a predetermined threshold.

Thereby, rules can be established that depend not only on elements of durations, times, but also on the degree of dependence on screens D.

According to one embodiment, it is also possible to analyze in real time the images consulted by a user within the open applications, e.g. by a previously trained artificial intelligence engine, to increase the reliability of the qualification data of the digital lifestyle.

In one embodiment, the server is suitable for determining whether a user suffers from a dependence, or addiction, on screens based on the degree of dependence on screens. More particularly, the server can be suitable for assigning a class to the user based on said degree of dependence on screens. This class may be chosen, e.g. from normal behavior, abnormal but non-problematic behavior, and problematic behavior that may belong to dependence, or addiction.

More particularly, the system can be designed to control the use of screens by a user. According to one embodiment, the apparatuses are initially restricted, at the beginning of a first time period, to a first set of functions, by means of the software modules and include means for determining behavioral information of the user and for transmitting these behavioral information to the server;

this server is suitable for providing an additional function among a second set of functions of the apparatuses according to the behavioral information, and for transmitting to the software module of a selected apparatus of the set of apparatuses, a message to enable the user to access this additional function.

Such additional function can be determined according to the degree of dependence on screens of the user.

The degree of dependence on screens D, as well as the aggregated measurements mi and the different rules for acting on the apparatuses 11, 12, 13, 14 according to this degree D can be accessible to an external apparatus 60. This external apparatus may belong to a third party, such as a psychologist, an addictologist physician, etc.

The external apparatus 60 can communicate with the server 50 in different conventional ways. For example, the server 50 may have a web server for exporting the data thereof via a web interface and via the http protocol.

According to one embodiment, the server 50 can be implemented by a set of circuits collocated in a centralized server or distributed within a server or among a set of servers. This set of servers may comprise arrangements such as "server farms" or "cloud computing".

The user can thereby be monitored remotely by a third party, via the transmission of the degree of dependence recalculated by periods (e.g. daily) from the server 50 to the external apparatus 60.

According to one embodiment, a monitoring period of a few weeks (e.g. 3 weeks) can be implemented to obtain a relevant view of the evolution of the dependence of the user.

According to one embodiment, the fidelity of the data can be increased for the probe embedded in an electrical plug or the device 203 with the detection of the user's smartphone. It is indeed usual for a user to have his smartphone nearby or even on him, and to move with same. The detection of the user's smartphone can thus make more robust the data detected by the embedded probe or the pedestal (device 203). Thereby, if the user's smartphone is not detected within a Bluetooth range of 10 meters, this means that the user is not present and the data from the probe embedded in a plug is not detected.

According to one embodiment, the fidelity of the data can be increased for the probe embedded in an electrical plug or the device 203 with the detection of the user's smartphone by not taking into account the data sent during the user's digital bedtime.

In one embodiment, the fidelity of the data from a tablet computer can be increased by a different password that is provided to each user to unlock the tablet computer in order to know whether the user to be monitored is currently using the tablet computer. After a specified period of non-use of the tablet computer, e.g. fifteen minutes, the tablet computer asks for a password again to prevent a user from using the account of another user who would have abandoned the tablet computer without closing his password session.

Of course, the present invention is not limited to the examples and to the embodiment described and shown, but is defined by the claims. In particular, the invention can have many variants accessible to a person skilled in the art.

The invention claimed is:

1. A system for determining a degree of dependence on screens of a user, including at least one software module embedded in a set of information processing apparatuses, adapted for collecting first measurements about a behavior of applications installed on said set of information processing apparatuses, and second measurements about a behavior of said set of information processing apparatuses;

a database for storing said measurements; and a server for periodically determining an aggregation of said measurements and a degree of dependence on screens according to said aggregation, the system further comprising at least one probe embedded in an electrical plug supplying power to at least one apparatus among a television set and a video game console, and apt to collect third measurements about an electrical behavior of said at least one apparatus; said server being adapted for determining said aggregation according to said third measurements.

2. The system according to claim 1, wherein said electrical plug is adapted for collecting a particular measurement in an event of a physical disconnection of said at least one apparatus.

3. The system according to claim 2, wherein said electrical plug is arranged so that, upon said physical disconnection, said electrical plug is no longer supplied with power.

4. The system according to claim 1, wherein said server is adapted for assigning a class to said user based on said degree of dependence on screens.

5. The system according to claim 1, wherein said server is adapted for determining an aggregation of measurements of the same nature from separate apparatuses.

6. A method for determining a degree of dependence on screens of a user, including collecting first measurements about a behavior of applications installed on a set of information processing apparatuses, and second measurements about a behavior of said set of information processing apparatuses, by at least one software module embedded in said set of information processing apparatuses;

storing said measurements in a database;

periodically determining an aggregation of said measurements and a degree of dependence on screens according to said aggregation, by a server;

further including collecting third measurements about an electrical behavior of at least one apparatus, by a probe embedded in an electrical plug supplying power to the at least one apparatus among a television set and a video game console, said aggregation taking into account said third measurements.

7. The method according to claim 6, including assigning a class to said user according to said degree of dependence on screens.

8. The method according to claim 7, implemented for a predefined period of time.

\* \* \* \* \*